United States Patent Office 3,518,040
Patented June 30, 1970

3,518,040
FORMATION OF URETHANE UNITS ON THE SURFACE OF POLYCARBONATE STRUCTURES
John R. Caldwell and Winston J. Jackson, Jr., Kingsport, Tenn., assignors to Eastman Kodak Company, Rochester, N.Y., a corporation of New Jersey
No Drawing. Continuation-in-part of application Ser. No. 409,987, Nov. 9, 1964. This application May 1, 1968, Ser. No. 725,893
Int. Cl. D06
U.S. Cl. 8—115.5
28 Claims

ABSTRACT OF THE DISCLOSURE

Urethane moieties or units are formed on the surface of polycarbonate structures or fibers by contacting the surface with either a primary or a secondary amine (having no amino group attached directly to an aromatic nucleus) at a temperature sufficient to form said moieties by reaction of the carbonate units at the surface with said polyamine. The urethane moieties reduce the tendency toward static electricity, improve the affinity for textile dyes, and improve the adhesion of printing ink and organic materials such as gelatin and synthetic polymer films.

---

This application is a continuation-in-part of Caldwell and Jackson U.S. Ser. No. 409,987, filed Nov. 9, 1964, now abandoned.

This invention relates to the treatment of linear, polycarbonate structures such as films and fibers so as to extend their utility.

The treatment of polycarbonate structures according to our invention includes bringing the surface into contact with a primary or secondary amine, said amine having no amino group attached directly to an aromatic nucleus, under conditions such that a substantial proportion of urethane moieties are formed on the surface through reaction of the amine with carbonate units at the surface.

The reaction at the surface of the polycarbonate proceeds as follows:

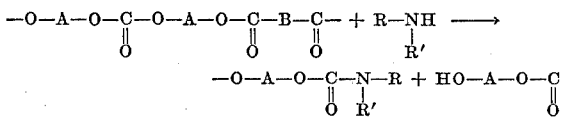

wherein A is the nucleus of an aromatic dihydroxy compound, R is an amino, aliphatic, or cycloaliphatic radical, and R' is a hydrogen atom, an aliphatic radical containing from one to eight carbon atoms (e.g., methyl, ethyl, n-butyl), or, when taken together with R, a saturated cyclic structure. Accordingly, the reaction for the production of the urethane units takes place with either primary or secondary, non-aromatic amines.

Aromatic amines are not effective in the practice of this invention. The term "aromatic amines" is used to designate those compounds having an amino group attached directly to an aromatic nucleus.

Various other amines are effective, examples of which include aliphatic, cycloaliphatic, and heterocyclic amines, as well as hydrazine and derivatives thereof. By "aliphatic, cycloaliphatic, and heterocyclic amines," we mean those compounds having an amino group attached directly to a carbon atom which is part of an aliphatic group, a cycloaliphatic ring, or a heterocyclic ring. The aliphatic and cycloaliphatic compounds have each amino group attached directly to a carbon atom which is attached directly to three other atoms, thereby excluding attachment to a benzene ring but including such compounds as p-xylene-$\alpha,\alpha'$-diamine.

The amines which are effective in our invention may be referred to either as amines having no amino group attached directly to an aromatic nucleus or as non-aromatic amines.

Polyesters such as polyethylene terephthalate do not react with either primary or secondary aromatic amines or with secondary aliphatic amines. Reaction of a polyester with a primary aliphatic amine requires considerably more strenuous conditions and proceeds as follows:

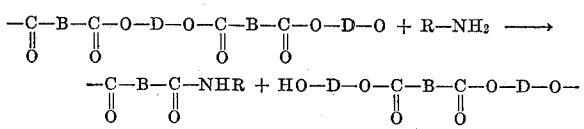

wherein B is the nucleus of a dicarboxylic acid, D is the nucleus of a diol, and R is an aliphatic radical. Accordingly, amide moieties are obtained in the reaction with an amine and a linear polyester whereas in the process of the present invention urethane moieties are obtained. As a result of this distinctive reactivity, the linear polycarbonate structures containing urethane groups on the surface can be expected to possess improved physical properties. The urethane moieties reduce the tendency toward static electrification; organic materials such as gelatin and synthetic polymer films and printing inks will readily adhere to the surfaces and the surfaces possess improved affinity for textile dyes. In addition, when the polycarbonate is treated according to this invention with an amino compound containing one or more primary, secondary, or tertiary amino groups in addition to a primary or secondary amino group, the additional amino groups give the polymer a polar surface which is responsible for its improved characteristics.

The process of the invention is applicable to a wide variety of linear polycarbonates prepared from aromatic dihydroxy compounds. Both hydroxy groups may be on one aromatic ring, such as in hydroquinone, or on different aromatic rings, such as the bisphenols described by Schnell in Ind. and Eng. Chem., 51, 157 (1959), and the bisphenols described by Caldwell and Jackson U.S. Pat. No. 3,317,466, issued May 2, 1967. The hydroxy groups also may be on different aromatic rings in a fused ring system, such as 2,5-naphthalenediol. Compounds containing a gem-bivalent radical having a polycyclic three-dimensional structure as in 4,4'-(2-norbornylidene)diphenol are also useful. The polycarbonates may be prepared from these aromatic dihydroxy compounds and phosgene as described in the above references. Copolymers may be obtained by using two or more bisphenols. All or a portion of the phosgene may be replaced by a diol bischloroformate as described in the above copending application.

Representative linear polycarbonates can be prepared from 4,4'-isopropylidenediphenol; 4,4'-(phenylmethylene)diphenol; 4,4' - (2 - norbornylidene)diphenol; 4,4'-(2 - norbornylidene)bis[2,6-dichlorophenol]; 4,4' - (2-norbornylidene)bis[2,6 - dibromophenol]; 4,4' - (2 - norbornylmethylene)diphenol; 4,4' - (hexahydro - 4,7 - methanoindan - 5 - ylidene)diphenol; 4,4'-(2,4,6-trichloro-$\alpha$-methylbenzylidene)diphenol; 1,4-naphthalenediol; hydroquinone; 5,6,7,8 - tetrahydro - 1,4 - naphthalenediol; etc. Other useful dihydroxy compounds and polycarbonates thereof are disclosed by U.S. Pats. 3,023,101 and 3,117,019.

A wide variety of primary and secondary, non-aromatic amines can be used for reaction with the polycarbonates. For example, as mentioned, aliphatic polyamines can be used to impart a polar surface to the polycarbonate structure. Representative amines are provided by the examples hereinafter. Additional amines are hydrazine; n-butylhydrazine; N,N - dimethylhydrazine; phenylhydrazine; hexanoic acid hydrazide; cyclohexylene diamine; cyclohexylene-dimethylene diamine; phenylenedimethylene diamine;

N,N - dimethyl - 1,3 - propanediamine; piperazine; and piperazines substituted by alkyl groups of one to four carbon atoms (e.g., methyl, ethyl, i-propyl, and n-butyl).

In general, the process of the invention is carried out by merely contacting the polycarbonate surfaces at a temperature sufficient to form the urethane moieties thereon by reaction of the non-aromatic amines with carbonate units on the surface. In some cases the reaction may be exothermic and cooling may be desirable. Otherwise, heating is used until the reaction has progressed to the desired extent. Temperatures of from about 20° to 150° C. can be used but may be as low as 0° C. and above 150° C.

The non-aromatic amines can be applied to the polycarbonate surface from inert solvent solution in a concentration of from about one to ten percent, but the concentration is not critical. Water, alcohol, ethers, and ketones are useful solvents as long as the surface is not adversely effected. Aromatic hydrocarbons are usually avoided since they tend to swell or dissolve the polycarbonate surface. It is advantageous to add 0.1 to 2 percent of a surfactant to the inert solvent to facilitate reaction between the dissolved non-aromatic amino compound and the polycarbonate. The surfactant (wetting agent) may be of either the ionic or non-ionic types. Types of ionic surfactants include salts of alkyl sulfates, salts of alkyl sulfonates, and salts of alkylated aromatic sulfonic acids. Types of non-ionic surfactants include alkylphenoxypolyethylene glycols with are sold under various trade names, such as Tritons (Rohm and Haas) and Igepals (Antara chemical Co.).

The following examples are included for a better understanding of this invention.

EXAMPLE 1

1,6-hexanediamine (three grams) was dissolved in 100 ml. of ethanol. Into this solution was placed a fabric made from drafted and heat-set fibers of a polycarbonate prepared from 4,4'-isopropylidene diphenol and phosgene. The fabric was removed from the solution after three minutes, dried, heated in an oven at 60° C. for 15 minutes, and then thoroughly washed with water. It was dyed with various acid wool dyes, such as Anthraquinone Green G, whereas the untreated fabric had no affinity for the dyes. Compared to the untreated fabric, the treated material showed a greatly reduced tendency to develop static electricity. When treated under the above conditions, fabrics of drafted and heat-set poly(ethylene terephthalate) and poly(1,4-cyclohexylenedimethylene terephthalate) had no affinity for the dyes. The fabrics also were not dyed when, after the amine-treatment, they were heated for 15 minutes in an oven at 100° C. instead of 60° C. When piperazine was used instead of 1,6-hexanediamine in Example 1, the same results were obtained: the treated polycarbonate fabric was dyed with acid wool dyes whereas the treated polyester fabrics and the untreated polycarbonate fabric were not dyed.

EXAMPLE 2

Triethylenetetramine (three grams) was dissolved in 100 ml. of water containing 0.5 gram of sodium lauryl sulfate (surfactant). Fabric made from the polycarbonate of 4,4' - (2 - norbornylidene)bis[2,6-dichlorophenol] was soaked in this solution for five minutes, removed, and allowed to dry at room temperature for 24 hours. It was then thoroughly washed with water. The fabric could be dyed with acid wool dyes whereas the untreated fabric had no affinity for the dyes. The treated material also showed a greatly reduced tendency to develop static electricity.

EXAMPLE 3

N-monoacetylethylenediamine (five grams) was dissolved in 100 ml. of isopropanol. Into this solution was placed a fabric made from drafted fibers derived from melt-spun polycarbonate produced from 4,4'-(cyclohexylmethylene)diphenol and diphenyl carbonate. The fabric was removed from the solution after five minutes, heated in a mineral oil bath at 100° C. for ten minutes, and then scoured. The treated fabric showed a greatly reduced tendency to develop static electricity when compared to the untreated fabric.

EXAMPLE 4

Monoethanolamine (two grams) and 0.5 gram of an alkylphenoxypolyethylene glycol (Triton X–100 from Rohm and Haas) were dissolved in 100 ml. of ethyl alcohol. Fabric made from a polycarbonate prepared from 4,4' - (hexahydro - 4,7-methanoindan-5-ylidene)diphenol and ethylene glycol bischloroformate was soaked in this solution at 75° C. for five minutes. The fabric was then thoroughly washed with water. It was dyed with acid wool dyes and showed a greatly reduced tendency to develop static electricity.

EXAMPLE 5

Films of polycarbonate produced from 4,4'-isopropylidenediphenol and phosgene were allowed to soak in the monoethanolamine solution of Example 4 for five minutes. The films were then heated in an oven at 100° C. for five minutes. After the oven treatment, the films were thoroughly washed with water. Coatings of gelatin, polyvinyl alcohol, and acrylic resins showed improved adhesion on the treated films, as compared with the untreated film. The treated films also showed a markedly reduced tendency toward developing static electricity by friction. In a typical photographic application, a gelatin layer containing a photographically active silver halide showed excellent adhesion under the usual conditions of processing and handling. The amine-treated film also had excellent adhesion for the usual subbing and precoating agents used in the manufacture of photographic film.

EXAMPLE 6

Films of polycarbonate produced from 4,4'-(2-norbornylidene)diphenol and phosgene were allowed to soak for two minutes in a solution at 75 C. containing three grams of N,N' - dimethyl - 1,3 - diaminopropane, one gram of sodium dodecylbenzenesulfonate and 100 ml. of water. The films were then washed with water and dried. A film was coated with an alcoholic solution of acrylic acid copolymer containing 15 percent acrylic acid and 85 percent methyl acrylate. The coating showed excellent adhesion on the treated film as compared to the untreated film. The treated films also dyed well with acid wool dyes and showed a markedly reduced tendency toward developing static electricity by friction. The film showed improved adhesion for printing ink, lacquer, and rubber.

EXAMPLE 7

Films of polycarbonate prepared from 4,4'-(2-norbornylidene)bis[2,6-dichlorophenol] and 1,4-butanediol bis-chloroformate were allowed to soak for five minutes in a solution containing six grams of

0.5 gram of sodium lauryl sulfate, and 100 ml. of ethanol. After the films were then heated in an oven at 120° C. for five minutes, they were thoroughly washed with water. The treated films dyed readily with acid wool dyes, showing that the amine was permanently attached to the surface. Coatings of gelatin, polyvinyl alcohol, and starch showed good adhesion to the treated films. Coatings of vinyl resins containing 10 to 20 percent acrylic or methacrylic acid in the polymer showed exceptionally good adhesion. A copolymer of maleic acid and vinyl acetate had good adhesion on a treated film. The coatings may be applied from aqueous or organic solvent solutions.

EXAMPLE 8

1,3-diamino-2-propanol (three grams) and one gram of an alkylphenoxypolyethylene glycol (Igepal CO–630 from Antara Chemical Co.) were dissolved in 100 ml. of ethanol. Dry-spun fibers obtained from a polycarbonate prepared from 4,4' - (2 - norbonylmethylene)diphenol and phosgene were soaked in the solution for three minutes, heated in an oven at 80° C. for 15 minutes, and washed with water. The treated fibers could be dyed with acid wool dyes and showed reduced tendency to develop static electricity.

EXAMPLE 9

Example 8 was repeated, using N,N-dimethyl-1,6-hexanediamine instead of the diaminopropanol. The fibers dyed well with acid wool dyes and showed reduced tendency to develop static electricity.

EXAMPLE 10

Example 5 was repeated, using hydrazine hydrate instead of ethanolamine. The films dyed with acid wool dyes, showing that combined hydrazine was present. Coatings of vinyl resins containing free carboxyl groups showed especially good adhesion on the treated film.

EXAMPLE 11

Example 4 was repeated, using 1,4 - cyclohexanebismethylamine instead of ethanolamine. Similar results were obtained.

EXAMPLE 12

Example 3 was repeated, using p-xylene-α,α'-diamine instead of acetylethylenediamine. The treated fabric could by dyed with acid wood dyes whereas the untreated fabric had no affinity for the dyes. The treated material also showed a greatly reduced tendency to develop static electricity.

EXAMPLE 13

Example 5 was repeated, using p-xylene-α,α'-diamine instead of ethanolamine. Similar results were obtained. The film also showed improved adhesion for natural and synthetic rubber and for printing ink.

EXAMPLE 14

Example 6 was repeated, using piperazine instead of the dimethyldiaminopropane. Similar results were obtained.

Treated fibers and films of the above examples that contain free amino groups have the capacity to absorb certain polyvalent metal ions from solution, such as copper, chromium, cobalt, nickel, and zinc, thus imparting an affinity for mordant or chelate-type dyes.

The invention has been described in detail with particular reference to preferred embodiments thereof, but it will be understood that variations and modifications can be effected within the spirit and scope of the invention as described hereinabove and as defined in the appended claims.

We claim:

1. A process for forming urethane moieties on the surface of shaped polycarbonate structures, said process consisting essentially of contacting the surface with a primary or secondary amine, said amine having no amino group attached directly to an aromatic nucleus, at a temperature in the range between 0° and 150° C. which is sufficient to form said moieties by reaction of carbonate units at the surface with said amine according to the reaction

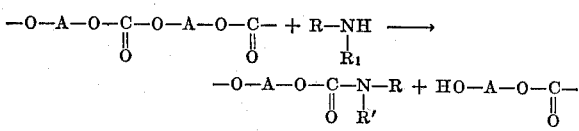

where

A is the nucleus of an aromatic dihydroxy compound,
R is amino group or an aliphatic, or cycloaliphatic radical, and
R' is a hydrogen atom, an aliphatic radical containing from one to eight carbon atoms, wherein R and R' can be combined to form a saturated cyclic structure.

2. A process as defined by claim 1 wherein said amine is a primary amine.
3. A process as defined by claim 1 wherein said amine is a secondary amine.
4. A process as defined by claim 1 wherein said amine is a polyamine.
5. A process as defined by claim 1 wherein said amine is 1,6-hexanediamine.
6. A process as defined by claim 1 wherein said amine is triethylenetetramine.
7. A process as defined by claim 1 wherein said amine is monoethanolamine.
8. A process as defined by claim 1 wherein said amine is hydrazine.
9. A process as defined by claim 1 wherein said amine is 1,4-cyclohexanebismethylamine.
10. A process as defined by claim 1 wherein said amine is p-xylene-α,α'-diamine.
11. A process as defined by claim 1 wherein said amine is piperazine.
12. A process as defined by claim 1 wherein said amine is N,N-dimethyl-1,3-propanediamine.
13. A process as defined by claim 1 wherein said polycarbonate is a polycarbonate of 4,4'-isopropylidenediphenol.
14. A process as defined by claim 1 wherein said polycarbonate is a polycarbonate of 4,4'-(2-norbornylidene)-diphenol.
15. A process for forming urethane moieties on the surface of a formed structure of a polycarbonate of a 4,4'-alkylidene diphenol, said process consisting essentially of contacting the surface with a primary or secondary amine, said amine having no amino group attached directly to an aromatic nucleus at a temperature in the range between 0° and 150° C. which is sufficient to form said moieties by reaction of carbonate units according to the reaction

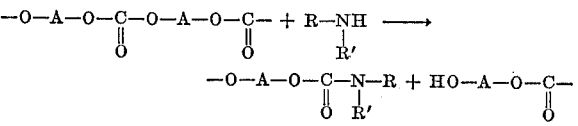

where

A is the nucleus of an aromatic dihydroxy compound,
R is an amino group or an aliphatic, or cycloaliphatic radical, and
R' is a hydrogen atom, an aliphatic radical containing from one to eight carbon atoms, wherein R and R' can be combined to form a saturated cyclic structure.

16. A process as defined by claim 15 wherein said 4,4'-alkylidene diphenol is 4,4'-isopropylidenediphenol.
17. A shaped polycarbonate structure having on the surface a substantial proportion of urethane moieties derived by a process consisting essentially of reacting carbonate units on the surface with a primary or secondary amine having no amino group attached to an aromatic nucleus, at a temperature in the range between 0° and 150° C. which is sufficient to form said moieties by reaction of carbonate units according to the reaction

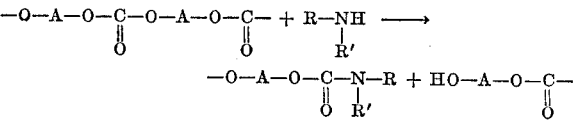

where

A is the nucleus of an aromatic dihydroxy compound,
R is an amino group or an aliphatic, or cycloaliphatic radical, and
R' is a hydrogen atom, an aliphatic radical containing from one to eight carbon atoms, wherein R and R' can be combined to form a saturated cyclic structure.

18. A shaped structure as defined by claim 17 wherein said amine contains more than one amino group.

19. A shaped structure as defined by claim 17 wherein said amine is 1,6-hexanediamine.

20. A shaped structure as defined by claim 17 wherein said amine is 1,4-cyclohexanebismethylamine.

21. A shaped structure as defined by claim 17 wherein said amine is piperazine.

22. A shaped structure as defined by claim 17 wherein said polycarbonate is derived from a 4,4'-alkylidene diphenol.

23. A shaped structure as defined by claim 17 wherein said polycarbonate is derived from 4,4'-isopropylidenediphenol.

24. A shaped structure as defined by claim 17 wherein dene)diphenol.
dene)-diphenol.

25. Polycarbonate fibers having on the surface a substantial proportion of urethane moieties derived by a process consisting essentially of reacting carbonate units on the surface with a primary or secondary amine having no amino group attached to an aromatic nucleus, at a temperature in the range between 0° and 150° C. which is sufficient to form said moieties by reaction of carbonate units according to the reaction

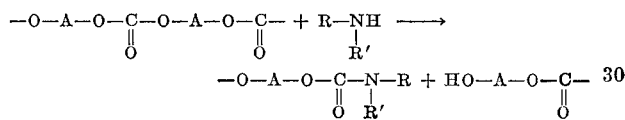

where
A is the nucleus of an aromatic dihydroxy compound,
R is an amino group or an aliphatic, or cycloaliphatic radical, and
R' is a hydrogen atom, an aliphatic radical containing from one to eight carbon atoms, wherein R and R' can be combined to form a saturated cyclic structure.

26. Polycarbonate fibers as defined by claim 25 wherein said amine is 1,6-hexanediamine.

27. Polycarbonate fibers as defined by claim 25 wherein said polycarbonate is derived from 4,4'-isopropylidenediphenol.

28. Polycarbonate fibers as defined by claim 25 wherein said polycarbonate is derived from 4,4'-(2-norbornylidene)diphenol.

References Cited

UNITED STATES PATENTS 3,418,066  12/1968  Caldwell et al. _____ 8—115.5

FOREIGN PATENTS 918,046  2/1963  Great Britain.
1,026,514  4/1966  Great Britain.
939,514  10/1963  Great Britain.
1,097,798  1/1968  Great Britain.

GEORGE F. LESMES, Primary Examiner
BERNARD BETTIS, Assistant Examiner

U.S. Cl. X.R.

8—31, 100, 168; 96—87; 117—47, 138.8, 139.5; 260—47

UNITED STATES PATENT OFFICE
CERTIFICATE OF CORRECTION

Patent No. 3,518,040  Dated June 30, 1970

Inventor(s) John R. Caldwell and Winston J. Jackson, Jr.

It is certified that error appears in the above-identified patent and that said Letters Patent are hereby corrected as shown below:

Column 1, lines 43 to 47, the formula should appear as shown below:

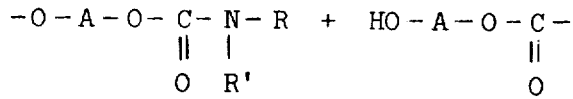

Column 5, line 29, "wood" should be --wool--.

Column 5, lines 65 to 70, the formula should appear as shown below:

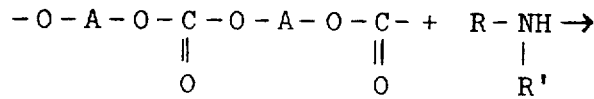

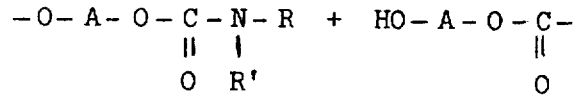

Column 7, lines 16 and 17, should be cancelled. Column 7, lines 16 and 17 of Claim 24 should be --said polycarbonate is derived from 4,4'-(2-norbornylidene)diphenol.--.

SIGNED AND SEALED
OCT 20 1970

(SEAL)
Attest:

Edward M. Fletcher, Jr.
Attesting Officer

WILLIAM E. SCHUYLER, JR.
Commissioner of Patents